H. L. DAZEY.
PNEUMATIC TIRE.
APPLICATION FILED APR. 21, 1908.
956,948.
Patented May 3, 1910.
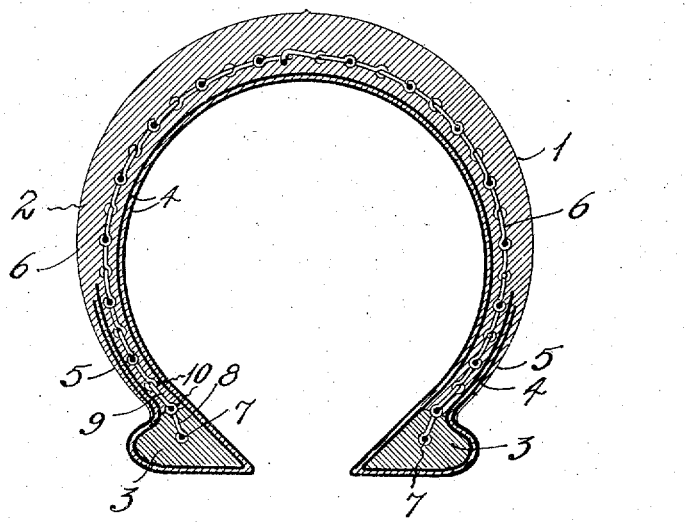
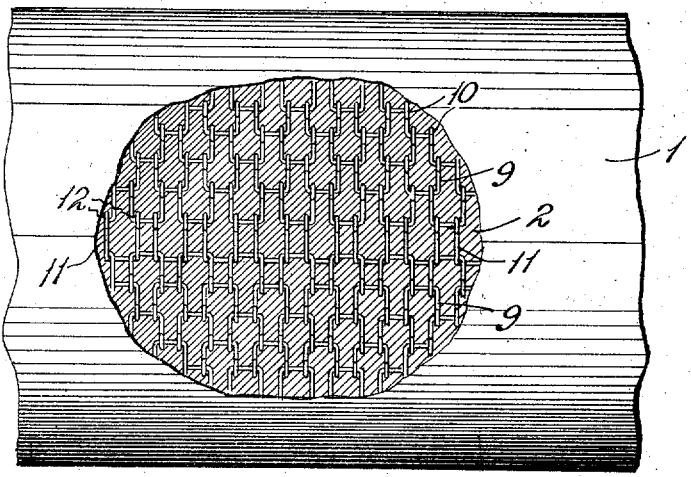
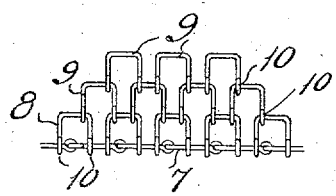
WITNESSES:
INVENTOR
Harry L. Dazey,
BY
ATTORNEY

UNITED STATES PATENT OFFICE.

HARRY L. DAZEY, OF DALLAS, TEXAS.

PNEUMATIC TIRE.

956,948.   Specification of Letters Patent.   Patented May 3, 1910.

Application filed April 21, 1908. Serial No. 428,415.

*To all whom it may concern:*

Be it known that I, HARRY L. DAZEY, citizen of the United States, residing at Dallas, in the county of Dallas and State of Texas, have invented certain new and useful Improvements in Pneumatic Tires, of which the following is a specification.

My invention relates to new and useful improvements in pneumatic tires.

The object of the invention is to incorporate in the tire, flexible reinforcing means and to extend said reinforcing means transversely through the outer casing of the tire from one side to the other, thereby strengthening the casing at points where it is usually weak and generally breaks and wears out.

Another object of the invention is to provide a device of the character described that will be strong, durable, efficient and simple, and comparatively inexpensive to construct, and also one in which the several parts will not be liable to get out of working order.

With the above and other objects in view, the invention has relation to certain novel features of construction and operation, an example of which is described in the following specification and illustrated in the accompanying drawings, wherein:

Figure 1 is a transverse sectional view of my improved tire casing, Fig. 2 is a plan view of a portion of the tire, broken away to show the reinforcing means, and Fig. 3 is a detail of the reinforcing means.

In carrying out my invention I construct the outer casing, indicated in the drawings by the numeral 1, with a rubber or elastic body 2 of the usual shape in use at the present time. The body is mounted on the usual shoe strips 3 about which two separated plies of fabric 4 are passed having their free ends terminating in the neck portion 5 of the body. These plies form the inner lining of the casing and are suitably connected to and embedded in the body, passing around the strips 3 as shown in Fig. 1.

It is a well known fact that the outer casing of a tire generally splits or breaks at the neck portions 5, as these portions are forced against the rim of the wheel with more or less pressure in proportion to the degree to which the tire is inflated. While the tread of the casing may be re-covered and repaired, it is very difficult and almost impossible to repair breaks in the neck portion and consequently what is known as a "blow-out" generally results from these breaks.

One of the features of my invention is to strengthen the casing at the neck portion and generally throughout the body. In accomplishing this, I provide reinforcing means in the nature of two sections of wire link fabric 6 embedded in the strips 3 and extending through the body 2 and connected at the center of the tread of the casing. Each section is formed along its lower edge of a longitudinal chain of straight links 7 embedded in the strip 3 at substantially the center thereof. Each section is built up from the chain 7 with inverted U-shaped wire links 8 and 9 alternating in alinement transversely of the casing. The links at their free ends are formed with loops or eyes 10, those of the links 8 engaging about the links 7, while those of the links 9 engage the links 8 and connect the subsequent links 9. Only the links 8 are embedded in the strips 3, the connection with the first row of links 9 occurring at the intersection of the strips with the body and thereby obviating a rigid connection at this point which would be detrimental to the life of the casing and interfere with its elasticity.

The sections pass through the body between the doubled portions of the fabric plies 4 at the neck portion and on through the body to the tread, being firmly embedded in the body nearer to its inner side. The sections are connected at the tread or central portion of the tire by U-shaped links 11 each bent to engage two links of the section at one end and provided with eyes or looped ends 12 engaging two links of the opposite section and thus forming a flexible connection. This reinforcement of linked fabric while strengthening the casing, will not interfere to any extent with the resiliency of the tire and at the same time will resist to the breaking point, all undue outward pressure and thus not only reinforcing the casing but the plies 4 and supporting them against bursting outward. The link fabric passing through the neck portions and between the plies 4 not only greatly strengthens the same and tends to obviate breaking of the casing, but where the casing does break will prevent "blow-outs" and not only hold the inner casings intact, but the outer casing in shape. By securing the lower end of the sections in the hard strips 3, they are held securely in position and prevented from working into the body and "buckling" which would cause them to become loose within the body and would be detrimental to the life of the same. By reason of the metallic reinforcement, the inner casing will be protected from puncture by the contact of the outer casing with glass, sharp stones, and other obstacles, which upon coming into contact with the said reinforcing means, will be turned to one side and bad cuts or incisions obviated.

What I claim, is:

A tire provided with a metallic armor embedded therein consisting of approximately U-shaped rectangular links alternately arranged and flexibly connected together at their corners whereby any pivotal movement of the links is in a plane transverse to the tire, and straight longitudinal linked members extending around the tire for securing the inner edges of the armor in place and being embedded in the rim engaging portion of the tire.

In testimony whereof I have signed my name to this specification in the presence of two subscribing witnesses.

HARRY L. DAZEY.

Witnesses:
    JACK A. SCHLEY,
    E. V. HARDWAY.